(12) United States Patent
Tiwari et al.

(10) Patent No.: US 11,468,238 B2
(45) Date of Patent: Oct. 11, 2022

(54) DATA PROCESSING SYSTEMS AND METHODS

(71) Applicant: Rupert Labs Inc., Mountain View, CA (US)

(72) Inventors: Mitul Tiwari, Mountain View, CA (US); Ravi Narasimhan Raj, Los Altos, CA (US); Madhusudan Mathihalli, Saratoga, CA (US); Kaushik Rangadurai, Sunnyvale, CA (US); Srivatsava Daruru, Mountain View, CA (US); Quaizar Vohra, Cupertino, CA (US); Deepak Bobbarjung, Sunnyvale, CA (US); Abhisaar Yadav, Los Altos, CA (US)

(73) Assignee: ServiceNow Inc., Santa Clara, CA (US)

( * ) Notice: Subject to any disclaimer, the term of this patent is extended or adjusted under 35 U.S.C. 154(b) by 425 days.

(21) Appl. No.: 16/676,174

(22) Filed: Nov. 6, 2019

(65) Prior Publication Data
US 2021/0133251 A1     May 6, 2021

(51) Int. Cl.
| | |
|---|---|
| *G06F 17/00* | (2019.01) |
| *G06F 40/289* | (2020.01) |
| *G06N 3/04* | (2006.01) |
| *G06F 40/30* | (2020.01) |
| *G06F 40/205* | (2020.01) |
| *G06F 40/247* | (2020.01) |
| *G06F 40/253* | (2020.01) |

(52) U.S. Cl.
CPC .......... *G06F 40/289* (2020.01); *G06F 40/205* (2020.01); *G06F 40/247* (2020.01); *G06F 40/253* (2020.01); *G06F 40/30* (2020.01); *G06N 3/04* (2013.01)

(58) Field of Classification Search
CPC .......... G06F 17/27; G06F 17/30; G06F 17/00
See application file for complete search history.

(56) References Cited

U.S. PATENT DOCUMENTS

| | | | |
|---|---|---|---|
| 5,978,594 A | 11/1999 | Bonnell | |
| 6,189,002 B1 * | 2/2001 | Roitblat | G06F 16/313 |
| | | | 707/E17.084 |

(Continued)

FOREIGN PATENT DOCUMENTS

| | | |
|---|---|---|
| JP | 11-213151 | 2/2000 |
| WO | 2018/208514 A1 | 11/2018 |
| WO | 2019/027992 A2 | 2/2019 |

OTHER PUBLICATIONS

Abujabal et al. Comqa: A community-sourced dataset for complex factoid question answering with paraphrase clusters. CoRR abs/1809.09528. 2018.

(Continued)

*Primary Examiner* — Shreyans A Patel
(74) *Attorney, Agent, or Firm* — Fletcher Yoder PC

(57) ABSTRACT

Example data processing systems and methods are described. In one implementation, a system accesses a corpus of data and analyzes the data contained in the corpus of data to identify multiple documents. The system generates vector indexes for the multiple documents such that the vector indexes allow a computing system to quickly access the plurality of documents and identify an answer to a question associated with the corpus of data.

20 Claims, 10 Drawing Sheets

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,678,887 B1 | 1/2004 | Hallman |
| 6,799,189 B2 | 9/2004 | Huxoll |
| 6,816,898 B1 | 11/2004 | Scarpelli |
| 6,879,976 B1 | 4/2005 | Brookler et al. |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,509,653 B2 | 3/2009 | Das et al. |
| 7,610,512 B2 | 10/2009 | Gerber |
| 7,617,073 B2 | 11/2009 | Trinon |
| 7,617,500 B2 | 11/2009 | Asti et al. |
| 7,630,784 B2 | 12/2009 | Hunt et al. |
| 7,653,650 B2 | 1/2010 | Kulkarni et al. |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,849,201 B1 | 12/2010 | Subbarao et al. |
| 7,877,783 B1 | 1/2011 | Cline |
| 7,890,802 B2 | 2/2011 | Gerber |
| 7,899,670 B1 | 3/2011 | Young et al. |
| 7,925,981 B2 | 4/2011 | Pourheidar |
| 7,930,396 B2 | 4/2011 | Trinon |
| 7,933,927 B2 | 4/2011 | Dee |
| 8,006,240 B2 | 4/2011 | Bhatkhande et al. |
| 7,941,506 B2 | 5/2011 | Bonal |
| 7,945,860 B2 | 5/2011 | Vambenepe |
| 7,958,031 B2 | 6/2011 | Hunt et al. |
| 7,966,398 B2 | 6/2011 | Wiles |
| 7,971,147 B2 | 6/2011 | Subbarao et al. |
| 8,051,164 B2 | 11/2011 | Peuter |
| 8,082,222 B2 | 12/2011 | Rangarajan |
| 8,112,354 B2 | 2/2012 | Lalwani et al. |
| 8,156,479 B2 | 4/2012 | Fong et al. |
| 8,224,683 B2 | 7/2012 | Manos |
| 8,266,096 B2 | 9/2012 | Navarrete |
| 8,321,220 B1 | 11/2012 | Chotimongkol |
| 8,346,752 B2 | 1/2013 | Sirota |
| 8,380,645 B2 | 2/2013 | Kowalski |
| 8,402,127 B2 | 3/2013 | Solin |
| 8,433,654 B2 | 4/2013 | Subbarao et al. |
| 8,457,928 B2 | 6/2013 | Dang |
| 8,473,361 B2 | 6/2013 | Subbarao et al. |
| 8,478,569 B2 | 7/2013 | Scarpelli |
| 8,554,750 B2 | 10/2013 | Rangaranjan |
| 8,612,289 B2 | 12/2013 | Subbarao et al. |
| 8,612,408 B2 | 12/2013 | Trinon |
| 8,646,093 B2 | 2/2014 | Myers |
| 8,650,078 B2 | 2/2014 | Subbarao et al. |
| 8,660,849 B2 | 2/2014 | Gruber |
| 8,674,992 B2 | 3/2014 | Poston |
| 8,683,032 B2 | 3/2014 | Spinelli |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 8,907,988 B2 | 12/2014 | Poston |
| 8,983,982 B2 | 3/2015 | Rangarajan |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,261,372 B2 | 2/2016 | Cline |
| 9,317,327 B2 | 4/2016 | Apte |
| 9,323,801 B2 | 4/2016 | Morozov |
| 9,363,252 B2 | 6/2016 | Mueller |
| 9,367,608 B1 | 6/2016 | Zhang |
| 9,412,084 B2 | 9/2016 | Kowalski |
| 9,467,344 B2 | 10/2016 | Gere |
| 9,508,051 B2 | 11/2016 | Falk |
| 9,535,737 B2 | 1/2017 | Joy |
| 9,557,969 B2 | 1/2017 | Sharma |
| 9,613,070 B2 | 4/2017 | Kumar |
| 9,626,717 B2 | 4/2017 | Sapugay et al. |
| 9,631,934 B2 | 4/2017 | Cline |
| 9,633,004 B2 | 4/2017 | Giuli et al. |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 9,870,356 B2 | 1/2018 | Hakkani-Tur et al. |
| 9,967,162 B2 | 5/2018 | Spinelli |
| 10,002,203 B2 | 6/2018 | George |
| 10,049,198 B2 | 8/2018 | Cecchi et al. |
| 10,049,199 B2 | 8/2018 | Cecchi et al. |
| 10,073,840 B2 | 9/2018 | Hakkani-Tur et al. |
| 10,235,358 B2 | 3/2019 | Tur et al. |
| 10,489,393 B1 | 11/2019 | Mittal et al. |
| 10,768,977 B1 | 9/2020 | Paul et al. |
| 11,003,863 B2 | 5/2021 | Hall et al. |
| 11,126,503 B2* | 9/2021 | Chang ............... G06F 16/24544 |
| 2003/0009331 A1 | 1/2003 | Schalkwyk et al. |
| 2003/0069880 A1 | 4/2003 | Harrison et al. |
| 2005/0033574 A1 | 2/2005 | Kim et al. |
| 2005/0108200 A1 | 5/2005 | Meik et al. |
| 2006/0080101 A1 | 4/2006 | Chotimongkol et al. |
| 2006/0130038 A1 | 6/2006 | Claussen et al. |
| 2007/0261065 A1 | 11/2007 | Asti et al. |
| 2008/0075444 A1 | 3/2008 | Subbarao et al. |
| 2009/0119102 A1 | 5/2009 | Bangalore |
| 2009/0327878 A1* | 12/2009 | Grandison ............ G06F 16/345 |
| | | 715/256 |
| 2010/0131274 A1 | 5/2010 | Stent et al. |
| 2010/0185943 A1* | 7/2010 | Wang ..................... G06F 40/258 |
| | | 715/254 |
| 2011/0035353 A1 | 2/2011 | Bailey |
| 2012/0158621 A1* | 6/2012 | Bennett ................ G06F 16/334 |
| | | 706/12 |
| 2012/0158791 A1 | 6/2012 | Kaneci |
| 2012/0246073 A1 | 9/2012 | Gore et al. |
| 2012/0290938 A1 | 11/2012 | Subbarao et al. |
| 2013/0055223 A1 | 2/2013 | Xu |
| 2014/0067379 A1 | 3/2014 | Kim |
| 2014/0114942 A1 | 4/2014 | Belakovskiy et al. |
| 2014/0163975 A1 | 6/2014 | Lee |
| 2014/0207441 A1 | 7/2014 | Larcheveque et al. |
| 2014/0258286 A1 | 9/2014 | Brown et al. |
| 2014/0279274 A1 | 9/2014 | Subbarao et al. |
| 2014/0297457 A1 | 10/2014 | Sapugay et al. |
| 2014/0297458 A1 | 10/2014 | Sapugay et al. |
| 2014/0303957 A1 | 10/2014 | Lee |
| 2015/0154173 A1 | 6/2015 | Kim |
| 2015/0269573 A1 | 9/2015 | Subbarao et al. |
| 2015/0278264 A1 | 10/2015 | Balani et al. |
| 2017/0069310 A1 | 3/2017 | Hakkani-Tur et al. |
| 2017/0083892 A1 | 3/2017 | Taira et al. |
| 2017/0177715 A1 | 6/2017 | Chang et al. |
| 2017/0242886 A1 | 8/2017 | Jolley |
| 2017/0242899 A1 | 8/2017 | Jolley |
| 2017/0243107 A1 | 8/2017 | Jolley |
| 2017/0286835 A1 | 10/2017 | Ho et al. |
| 2017/0300471 A1* | 10/2017 | Simske ................ G06F 40/263 |
| 2017/0329760 A1 | 11/2017 | Rachevsky |
| 2017/0329842 A1 | 11/2017 | Ng Tari |
| 2018/0018392 A1* | 1/2018 | Simske ................ G06F 16/353 |

(56) References Cited

U.S. PATENT DOCUMENTS

| | | |
|---|---|---|
| 2018/0068016 A1 | 3/2018 | Roy |
| 2018/0075844 A1 | 3/2018 | Kim |
| 2018/0083893 A1 | 3/2018 | Viswanathan et al. |
| 2018/0131645 A1 | 5/2018 | Magliozzi et al. |
| 2018/0329882 A1 | 11/2018 | Bennett et al. |
| 2019/0065576 A1 | 2/2019 | Peng et al. |
| 2019/0103092 A1 | 4/2019 | Rusak et al. |
| 2019/0103101 A1 | 4/2019 | Danila et al. |
| 2019/0103111 A1 | 4/2019 | Tiwari et al. |
| 2019/0124020 A1 | 4/2019 | Bobbarjung et al. |
| 2019/0138554 A1 | 5/2019 | Remis et al. |
| 2019/0180195 A1 | 6/2019 | Terry et al. |
| 2019/0197116 A1* | 6/2019 | Vlad .................. G06F 40/284 |
| 2019/0306315 A1 | 10/2019 | Portman et al. |
| 2019/0318009 A1* | 10/2019 | Miller .................. G06F 16/243 |
| 2019/0347328 A1* | 11/2019 | Rush ...................... G10L 25/30 |
| 2019/0362020 A1* | 11/2019 | Paulus .................. G06N 3/006 |
| 2020/0125678 A1 | 4/2020 | Conley et al. |
| 2020/0218939 A1 | 7/2020 | Mansour et al. |
| 2020/0302019 A1 | 9/2020 | Hall et al. |
| 2020/0311106 A1* | 10/2020 | Zhao .................. G06F 16/5838 |
| 2020/0342032 A1 | 10/2020 | Subramaniam et al. |
| 2020/0395001 A1 | 12/2020 | Mohanty et al. |
| 2021/0081819 A1 | 3/2021 | Pollert et al. |
| 2021/0232613 A1 | 7/2021 | Raval Contractor et al. |

OTHER PUBLICATIONS

Bannard and Callison-Burch, Paraphrasing with bilingual parallel corpora. In Proceedings of the 43rd Annual Meeting of the Association for Computational Linguistics (ACL), 597-604. 2005.

Barzilay and McKeown, 2001. Extracting paraphrases from a parallel corpus. In Proceed-ings of the 39th Annual Meeting on Association for Computational Linguistics (ACL), 50-57. 2001.

Berant and Liang, Semantic parsing via paraphrasing. In Proceedings of the 52nd Annual Meeting of the Association for Computational Linguistics (ACL), vol. 1, 1415-1425. 2014.

Bhagat and Hovy, E. H. 2013. What is a paraphrase? Computational Linguistics 39:463-472.

Callison-Burch, Osborne, and Koehn, Re-evaluation the role of Bleu in machine translation research. In 11th Conference of the European Chapter of the Association for Computational Linguistics. Association for Computational Linguistics. 2006.

Cer et al. SemEval-2017 task 1: Semantic textual similarity multilingual and crosslingual focused evaluation. In Proceedings of the 11th International Workshop on Semantic Evaluation (SemEval), 1-14.2017.

Cer et al. Universal sentence encoder. CoRR abs/1803.11175. 2018.

Chen and Bansal, Fast abstractive summarization with reinforce-selected sentence rewriting. In Proceedings of the 56th Annual Meeting of the Association for Computational Linguistics (ACL), vol. 1,675-686. 2018.

Devlin et al. BERT: pre-training of deep bidirectional transformers for language understanding. In Proceedings of the 2019 Conference of the North American Chapter of the Association for Computational Linguistics: Human Language Technologies (NAACL-HLT), vol. 1, 4171-4186. 2019.

Dolan and Brockett, Automatically constructing a corpus of sentential paraphrases. In Third International Workshop on Paraphrasing (IWP). Asia Federation of Natural Language Processing. 2005.

Dubou'E and Chu-Carroll, Answering the question you wish they had asked: The impact of paraphrasing for question answering. In Proceedings of Human Language Technology Conference of the North American Chapter of the Association of Computational Linguistics. 2006.

Fader, Zettlemoyer, and Etzioni, Paraphrase-driven learning for open question answering. In Proceedings of the 51st Annual Meeting of the Association for Computational Linguistics, (ACL), 1608-1618. 2013.

Ganitkevitch, Van Durme, and Callison-Burch, PPDB: The paraphrase database. In Proceedings of the 2013 Conference of the North American Chapter of the Association for Computational Linguistics: Human Language Technologies, 758-764. 2013.

Gupta et al. A deep generative framework for paraphrase generation. In Proceedings of the Thirty-Second AAAI Conference on Artificial Intelligence, (AAAI), 5149-5156. 2018.

Kitaev and Klein, Constituency parsing with a self-attentive encoder. In Proceedings of the 56th Annual Meeting of the Association for Computational Linguistics (vol. 1). 2018.

Kumar et al. Submodular optimization-based diverse paraphrasing and its effectiveness in data augmentation. In Proceedings of the 2019 Conference of the North American Chapter of the Association for Computational Linguistics: Human Language Technologies, vol. 1, 3609-3619. 2019.

Lavie and Agarwal, Meteor: An automatic metric for mt evaluation with high levels of correlation with human judgments. In Proceedings of the Second Workshop on Statistical Machine Translation, StatMT, 228-231. 2007.

Li et al. Paraphrase generation with deep reinforcement learning. In Proceedings of the 2018 Conference on Empirical Methods in Natural Language Processing, 3865-3878. 2018.

Lin, Rouge: A package for automatic evaluation of summaries. In Text Summarization Branches Out, 74-81. 2004.

Mallinson, Sennrich, and Lapata, Paraphrasing revisited with neural machine translation. In Proceedings of the 15th Conference of the European Chapter of the Association for Computational Linguistics: vol. 1, 881-893. 2017.

Miller, Wordnet: A lexical database for english. Commun. ACM 38(11):39-41.

Narayan, Cohen, and Lapata, Ranking sentences for extractive summarization with reinforcement learning. In Proceedings of the 2018 Conference of the North American Chapter of the Association for Computational Linguistics: Human Language Technologies, NAACLHLT, vol. 1, 1747-1759. 2018.

Papineni et al. Bleu: A method for automatic evaluation of machine translation. In Proceedings of the 40th Annual Meeting on Association for Computational Linguistics, 311-318. 2002.

Prakash et al. Neural paraphrase generation with stacked residual LSTM networks. In Proceedings of the 26th International Conference on Computational Linguistics (COLING), 2923-2934. 2016.

Wang et al. Glue: A multi-task benchmark and analysis platform for natural language understanding. In 7th International Conference on Learning Representations, ICLR2019, New Orleans, LA, USA, May 6-9, 2019.

Zhang, Baldridge, and He, Paws: paraphrase adversaries from word scrambling. In Proceedings of the 2019 Conference of the North American Chapter of (NAACL-HLT), vol. 1, 1298-1308. 2019.

Chen, Yun-Nung, et al.; "Syntax or semantics? knowledge-guided joint semantic frame parsing." 2016 IEEE Spoken Language Technology Workshop (SLT); IEEE, Dec. 2016, pp. 348-355 (Year 2016).

Reuer, Vet; "Error recognition and feedback with lexical functional grammer" CALICO Journal, Jan. 2003, pp. 197-512 (Year: 2003).

Shi, Yongmei, et al.: "error detection using linguistic features." roceedings of the conference on Human Language Technology and Empirical Methods in Natural Language Processing, Association for Computational Linguistics, Oct. 2005, pp. 41-48 (Year: 2005).

Zhou, Weidong, et al.: "Detecting errors in Chinese spoken dialog system using ngram and dependency parsing." Oct. 2008, pp. 532-535 (Year 2008).

Cerisara, Christophe, et al. "On the efffects of using word2vec representations in neural networks for dialogue act recognition" Computer Speech & Language, 47, Jan. 2018, pp. 175-193 (Year: 2018).

Di Eugenio, Barbara, et al.; "Dialogue act classification, higher order dialogue structure, and instance-based learning" Dialogue & Discourse 1.2, Jun. 2010, pp. 1-24 (Year: 2010).

Guo, Daniel, et al.; "Joint semantic utterance classification and siot filling with recursive neural networks." 2014 IEEE Spoken Lagnguage Technology Workshop (SLT). IEEE, Dec. 2014, pp. 554-559. (Year 2014).

(56) References Cited

OTHER PUBLICATIONS

Korpusik, mandy, et al.; "Spoken language understanding for a nutrition dialogue system." IEEE/ACM Transactions on Audio, Speech, and language Processing, 25.7, Jul. 2017, pp. 1450-1461. (Year 2017).
Liu, Bing, et al.; "Attention-based recurrent neural network models for joint intent detection and slot filling." arXiv preprint arXiv: 1609.01454, Sep. 2016, pp. 1-5 (Year 2016).
Stolcke, Andreas, et al.; "Dialogue act modeling for automatic tagging and recognition of conversational speech." Computational linguistics 26.3, Sep. 2000, pp. 339-373 (Year: 2000).
Yang, Lin-Er, et al.; "Neural Parse Combination." Journal of comuter szcience and Technology 32.4, Jul. 2017. pp. 749-757 (Year: 2017).
Zheng, Yang, et al.; "intent detection and semantic parsing for navigation dialogue language processing," 2017 IEEE 20th International Ocnference on Intelligent Transportion Systems (ITSC), IEEE, Oct. 2017, pp. 1-6 (Year: 2017).
Kim Joo-Kyung et al.: "Intent detection using semantically enriched word embeddings", 2016 IEEE Spoken Language Technology Workshop, IEEE, Dec. 13, 2016; XP033061772, pp. 414-419.
Jiahui Gu: "Query Intent Detection Based on Clustering of Phrase Embedding", Social Media Processing: SMP 2016 5th National Conference, vol. 669, Jan. 1, 2016; pp. 110-122, XP009515060.
Partial International Search and Written Opinion for PCT Application No. PCT/US2020/059236 dated Feb. 22, 2021 (14 pgs.).

\* cited by examiner

FIG. 6

| Source | Generated 1 | Generated 2 |
|---|---|---|
| how to resume the preset speed ? | how can i restart the default speed ? | how to recover the preset speed ? |
| how do i activate voice commands? | how do i activate the speech command ? | how do i activate voice control ? |
| change your payment method | payment method amendment | switch your payment method |
| credit limit increases | credit bound increase | raising the credit limit |
| when can i rely on ice? | when can i be dependent upon ice ? | when can i count on ice ? |

FIG. 8

```
output=[];
sort(pool); sentencoding=USE(input);
for paraphrase in pool do
    vector=USE(paraphrase);
    for paraphrase2 in output do
        if cosine(USE(paraphrase2), vector) > 0.95
          then
            break;
        end
    end
    if cosine(vector,sentencoding) < 0.95 then
        append paraphrase to output;
    end
end
```

FIG. 9

```
wordset={words in input};
output=[];
while len(output) < k do
    select paraphrase from pool with most number of
      unique words;
    if no such paraphrase exists then
        break;
    else
        output.append(paraphrase);
        pool.remove(paraphrase);
        wordset.append(new words in input)
    end
end
```

FIG. 10

DATA PROCESSING SYSTEMS AND METHODS

RELATED APPLICATIONS

This application is related to U.S. application Ser. No. 16/676,054 filed Nov. 6, 2019 and U.S. application Ser. No. 16/676,123 filed Nov. 6, 2019, which are hereby incorporated herein by reference in their entirety for all purposes.

TECHNICAL FIELD

The present disclosure relates to systems and methods that are capable of analyzing and processing data to create an index of information for answering questions and the like.

BACKGROUND

The use of bots in various systems, including systems with one or more computing devices, is growing rapidly. A bot (also referred to as an "Internet bot", a "web robot", and other terms) is a software application that executes various operations (such as automated tasks) via the Internet or other data communication network. For example, a bot may perform operations automatically that would otherwise require significant human involvement.

Example bots include chatbots that communicate with users via a messaging service, and voice assistants that communicate with users via voice data or other audio data. In some situations, chatbots simulate written or spoken human communications to replace a conversation with a real human person. In some implementations, a bot may interact with a user to provide information to the user in response to a question or other request for information.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 6 illustrates an example article extraction from XML, using PDF as a reference.

FIG. 8 illustrates example paraphrases.

FIGS. 9 and 10 illustrate example algorithms for performing deduplication.

DETAILED DESCRIPTION

Figure 1:
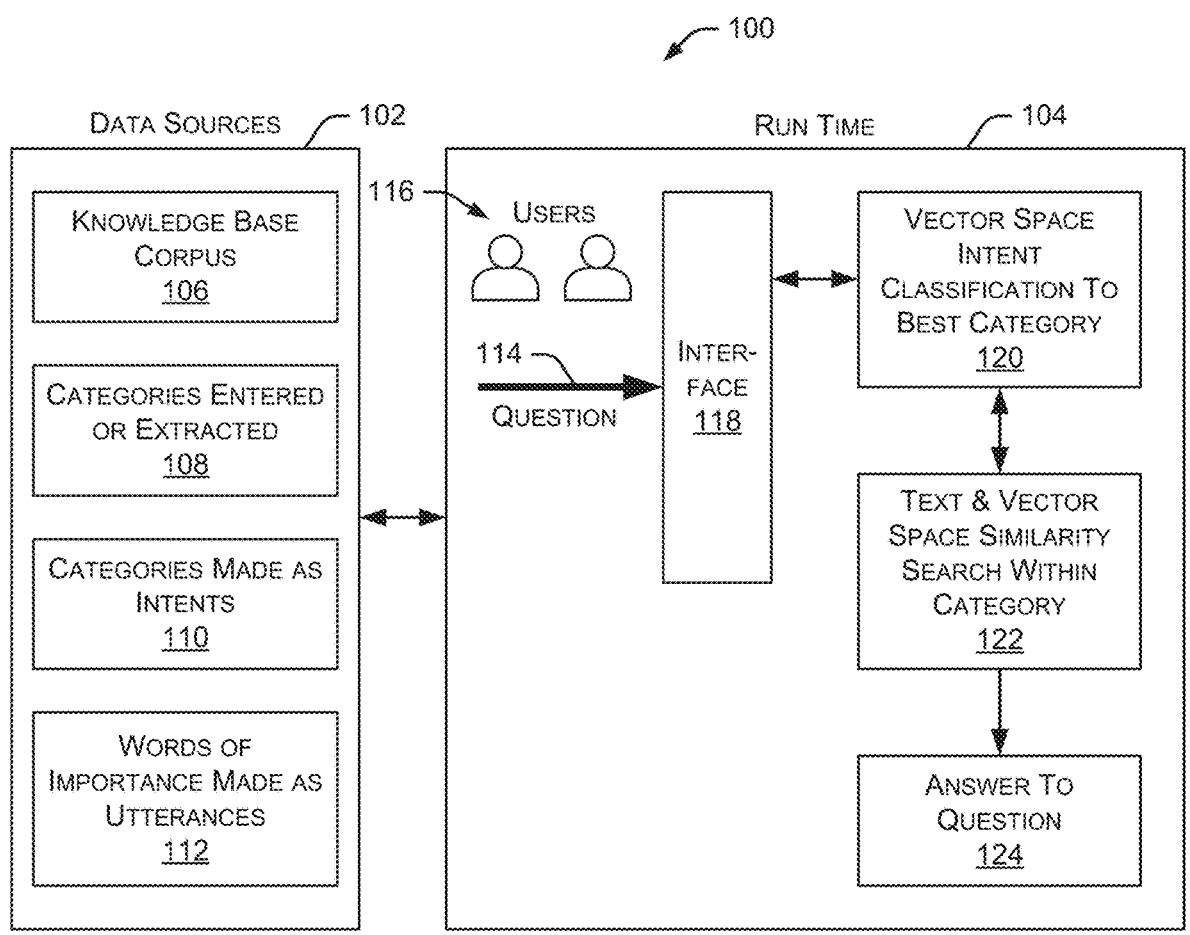
FIG. 1 is a block diagram illustrating an environment within which an example embodiment may be implemented.

In the following disclosure, reference is made to various figures and drawings which are shown as example implementations in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

The systems and methods discussed herein provide a conversational interface that includes an ability to interact with a computing system in natural language and in a conversational way. The described systems and methods also include a bot building platform as described herein. The systems and methods described herein enable a computing system to understand natural language so it can interpret what the user means in terms of intent and identify information to generate a response back to the user. Intent identification is a part of natural language understanding to determine an intent from the natural language of a user.

The systems and methods described herein relate to data processing systems that analyze and process data to create an index of information for answering questions and the like. Additionally, run time processing systems receive messages from one or more users and generate responses to the messages based on the index of information. In particular embodiments, systems and methods are described that access information from a corpus of data and creates an index of documents (or data elements) that are used at run time for answering questions or requests for information from one or more users. For example, particular applications may access information from a corpus of data associated with a vehicle, such as a vehicle owner's manual, vehicle operator's manual, frequently asked questions and answers, and the like. The data associated with the vehicle is indexed to aid in future access to relevant information. At a future time, a vehicle owner or vehicle operator may ask a question related to the vehicle. The described systems and methods can accessed the indexed data to provide an answer to the question. A similar approach is used for any type of data associated with any product, service, topic, issue, and the like.

FIG. 1 is a block diagram illustrating an environment 100 within which an example embodiment may be implemented. Any number of data sources 102 represent a corpus of data associated with a particular topic, product, service, issue, and the like. Example data sources 102 include a knowledge base corpus 106, categories that are entered or extracted 108, categories made as intents 110, and words of importance made as utterances 112. The knowledge base corpus 106 includes, for example, operating manuals, user manuals, frequently asked questions and answers, articles, product support documents, catalogs, and the like. These items may be referred to herein as "documents", "articles", "information", and "data". The knowledge base corpus 106 includes data in any number of formats, such as CSV files, JSON files, PDF documents, html pages, and the like. In some embodiments, the knowledge base corpus 106 is accessed from websites, databases, and any other data sources.

In some embodiments, the knowledge base corpus 106 is accessed from multiple sources. These data sources may be normalized into a common format, such as CSV or JSON and mapped to certain fields in an index, as discussed herein. An example type of document may expect title, description, tags, category, and subcategory fields. If data cannot be mapped to an existing field, then a new type of document index is created. Some data sources may need further processing to join some sources.

The categories entered or extracted 108 include information associated with an optional field for the category of particular documents. The category of a document can be entered manually (e.g., by a user) or extracted automatically from a manual, where, for example, a chapter name could be the category of the document. In some embodiments, these categories are used for creating intents automatically, which can help in narrowing the search space when a user enters a message. The categories made as intents 110, as discussed herein, may be used in combination with the categories entered or extracted 108. The words of importance made as utterances 112 are important words and phrases that are extracted from each document in the knowledge base. These phrases or words of importance are added as utterances for the corresponding document. An automated utterance generation process (discussed herein) is part of extracting words and phrases of importance from each document.

As shown in FIG. 1, a runtime 104 processes various questions 114 and requests from any number of users 116 via any type of interface 118. For example a vehicle operator (a user 116) may submit a question 114 related to a particular vehicle feature or operation of the vehicle. Interface 118 includes any type of user interface, such as a voice interface, a text interface, communication tools, artificial intelligence bots, chatbots, and the like.

Run time 104 also includes vector space intent classification to a best category 120 which attempts to classify the intent of a particular question 114. A text and vector space similarity search within a category 122 includes a text similarity search and/or a vector space similarity search. A text similarity search includes traditional information retrieval methods to search for the presence of words (or synonyms) in a given query. A vector space similarity search is performed by converting a query to a vector using sentence embedding during run time and comparing the query vector to the document vectors in the index (computed offline) to find the most relevant document to the query. Run time 104 generates an answer to question 124, as discussed herein.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
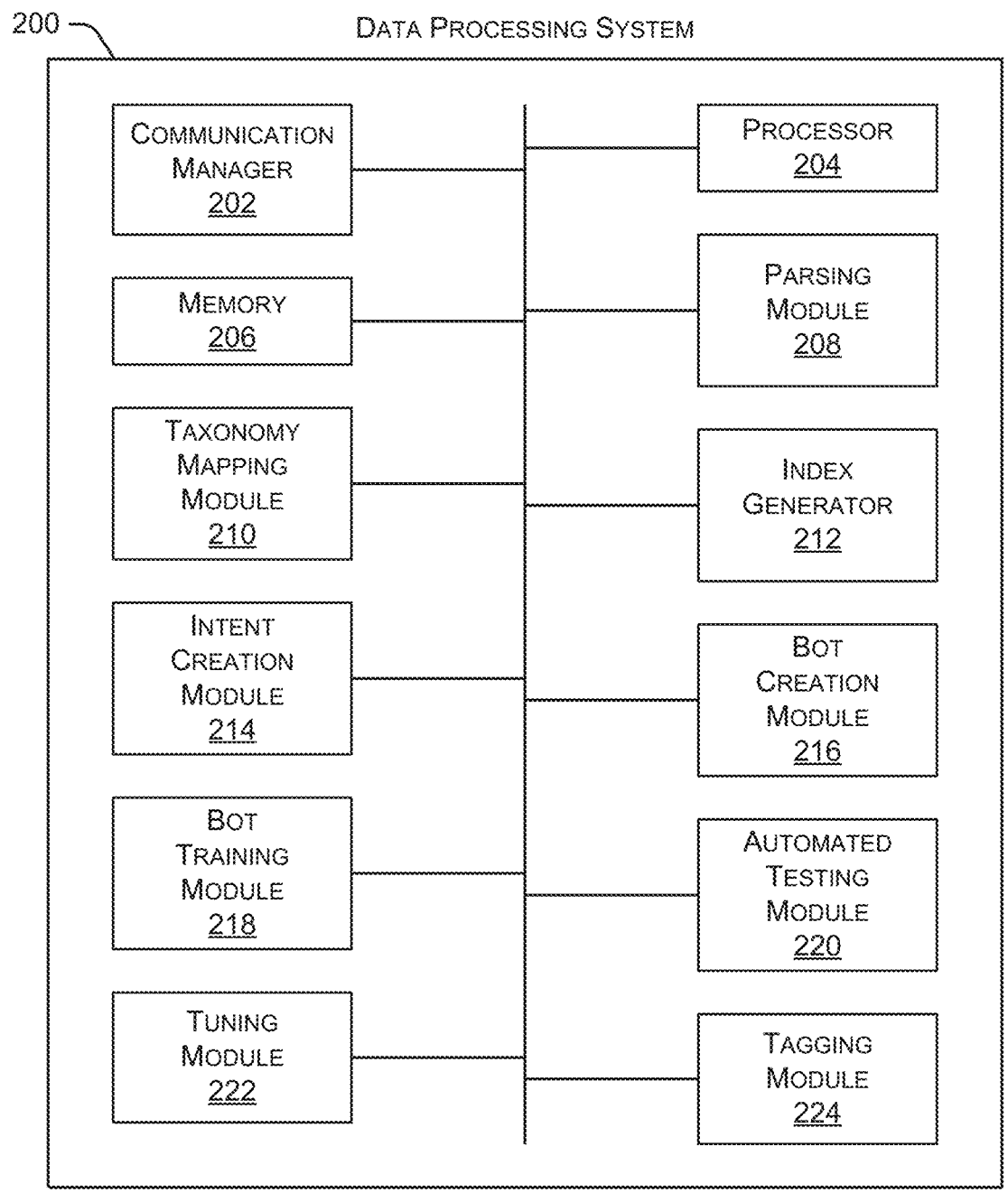
FIG. 2 is a block diagram depicting an embodiment of a data processing system.

FIG. 2 is a block diagram depicting an embodiment of a data processing system 200. As shown in FIG. 2, data processing system 200 includes a communication manager 202, a processor 204, and a memory 206. Communication manager 202 allows data processing system 200 to communicate with other systems, such as the various systems discussed herein. Processor 204 executes various instructions to implement the functionality provided by data processing system 200, as discussed herein. Memory 206 stores these instructions as well as other data used by processor 204 and other modules and components contained in data processing system 200.

Data processing system 200 also includes a parsing module 208 that parses information from various data sources 102, and a taxonomy mapping module 210 that maps a parsed article (or other information) to a node in a predefined taxonomy of topics. In some embodiments, taxonomy mapping module 210 specifies how different fields need to be treated, analyzed, and indexed. An index generator 212 creates one or more indexes, as discussed herein. An intent creation module 214 automatically creates intents based on the parsed articles and other information.

Data processing system 200 also includes a bot creation module 216 that manages the creation of one or more bots, such as conversational bots, as discussed herein. A bot training module 218 trains bots using various models to identify the intent of a message or information. An automated testing module 220 measures the accuracy of a particular bot and works with a tuning module 222 and a tagging module 224 to improve the accuracy and relevancy of the bot.

Figure 3:
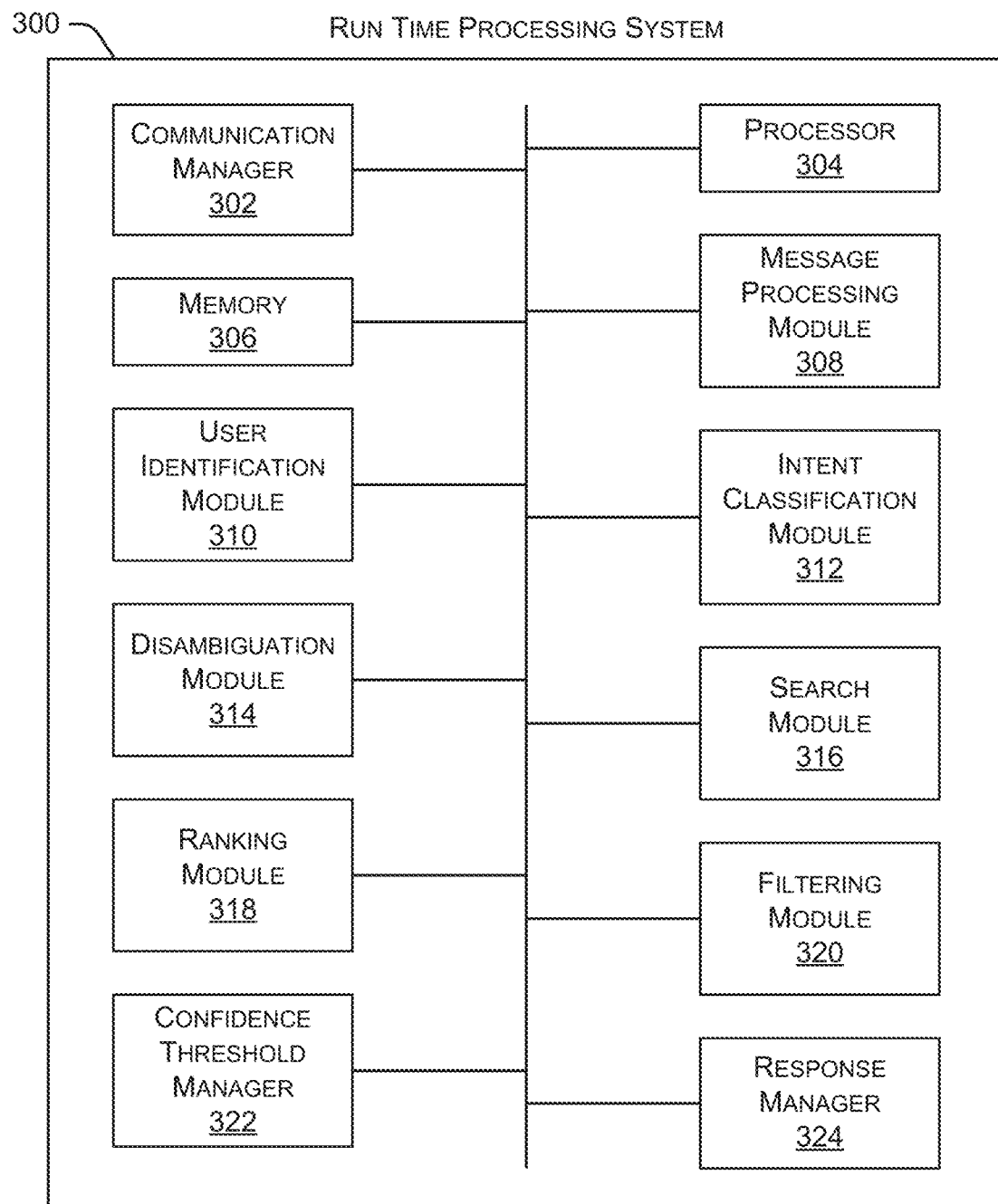
FIG. 3 is a block diagram depicting an embodiment of a run time processing system.

FIG. 3 is a block diagram depicting an embodiment of a run time processing system 300. As shown in FIG. 3, run time processing system 300 includes a communication manager 302, a processor 304, and a memory 306. Communication manager 302 allows run time processing system 300 to communicate with other systems, such as the various systems discussed herein. Processor 304 executes various instructions to implement the functionality provided by run time processing system 300, as discussed herein. Memory 306 stores these instructions as well as other data used by processor 304 and other modules and components contained in run time processing system 300.

Run time processing system 300 also includes a message processing module 308 that receives and manages the processing of messages (e.g., questions) from one or more users. A user identification module 310 determines the identity of a particular user and an intent classification module 312 applies an intent classification model to a received message. A disambiguation module 314 presents various disambiguation options, if necessary, to a user. A search module 316 identifies one or more articles or other information to respond to the user's message. A ranking module 318 ranks the one or more identified articles and a filtering module 320 applies one or more filters to identify the best articles or other information. A confidence threshold manager 322 determines if the articles or other information are above a confidence threshold and a response manager 324 returns an appropriate response to a user. In some embodiments, run time processing system 300 may be included in a vehicle, kiosk, computing system, or any other device or system.

Figure 4:
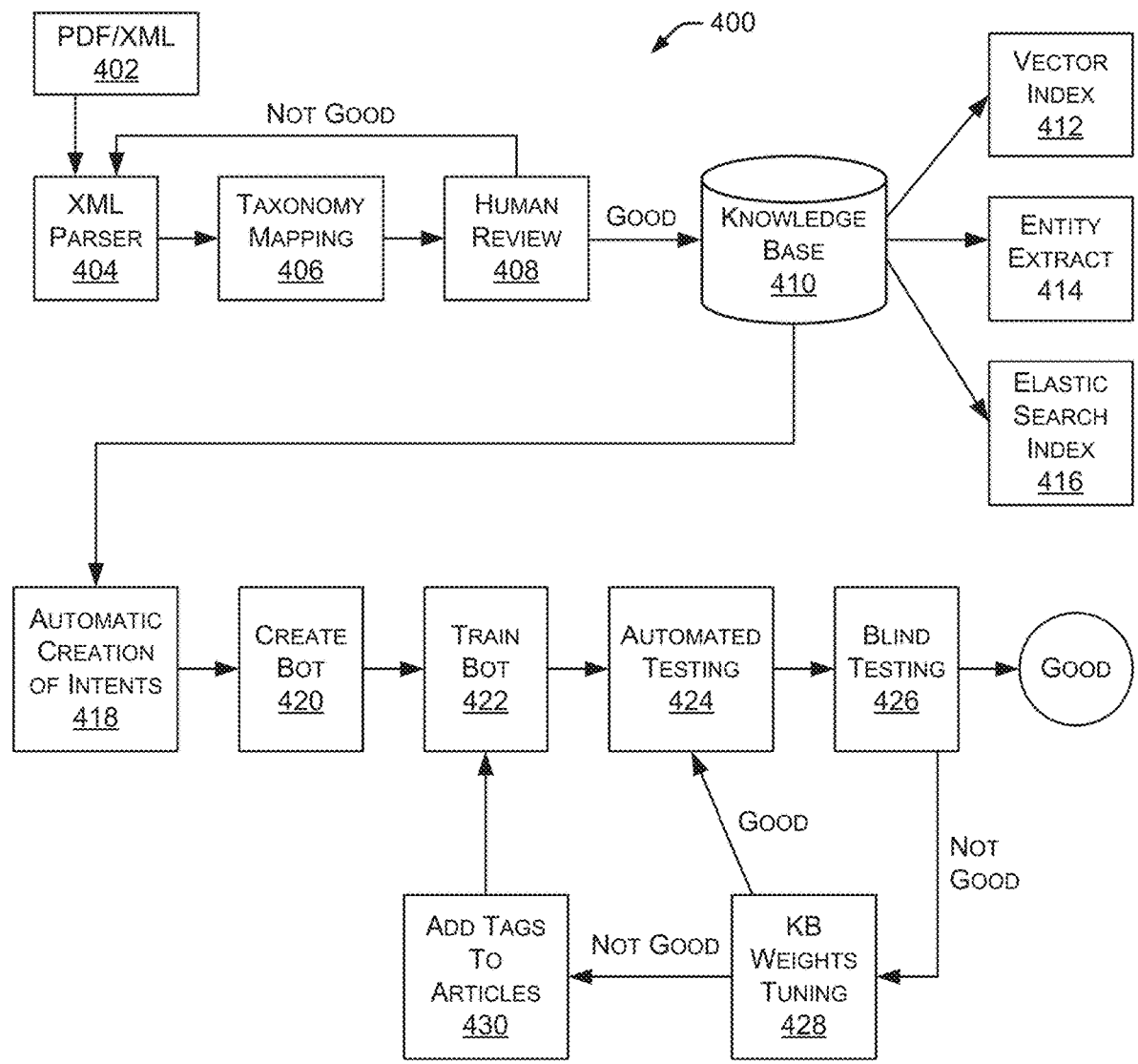
FIG. 4 is a process diagram depicting an embodiment of a method for processing data from one or more data sources.

FIG. 4 is a process diagram depicting an embodiment of a method 400 for processing data from one or more data sources. For example, method 400 accesses multiple data sources or knowledge bases and creates a conversational bot that can answer questions related to the data received from the multiple data sources or knowledge bases.

As shown in FIG. 4, a parser (e.g., an XML, parser) 404 receives a PDF/XML, document 402 or other information/article as an input. Parser 404 includes an algorithm to parse the received document 402. For example, parser 404 may separate a document or other data item into multiple chapters, categories, subcategories, text pieces, and the like. Taxonomy mapping 406 includes mapping the parsed document to a node in a predefined taxonomy of topics, such as car functions or parts. A human review 408 is performed to determine if the taxonomy mapping was good (e.g., accurately mapped into the correct topic in the taxonomy). If the mapping was not good, human review 408 includes returning the document/article to the parser to perform the taxonomy mapping again. In some embodiments, the human review also includes a suggested topic and category to train/teach the automatic mapping (e.g., taxonomy mapping) algorithm.

If human review 408 determines that the mapping is good, the correct taxonomy mapping is stored in knowledge base 410. In some embodiments, a vector index 412 includes sentences in the knowledge base 410 embedded into vectors. An index is created for computing similarity, which results in the vector index 412. In some embodiments, sentence embedding is used to create vectors for the document (e.g., title, sentences, and utterances) that are stored in the vector index 412. An entity extraction 414 extracts meaningful entities from the knowledge base 410 and adds those entries to the index. In some embodiments, various entities such as user-specified information, topics of importance, noun phrases, and the like are extracted and stored 414. An elastic search index 416 is an information retrieval index that uses an inverted word-document index. In some embodiments, elastic search index 416 supports various types of analysis, mapping fields, querying, and ranking results. An elastic search system supports traditional information retrieval based searches. In some embodiments, the elastic search system is used for text indexing, traditional text searching, and the like. The indexes 412, 414, and 416 are used during run time to quickly identify answers to user questions and other user messages. For example, the indexes 412, 414, and 416 may be stored in knowledge base 410. In some embodiments, an analyzer specifies different ways that the data can be transformed both during indexing and querying time. For example, the analyzer may support different ways to specify stemming, stop words, casing, synonyms, and the like.

Method 400 continues with an automatic creation of intents 418. For each category of articles, the method automatically creates intents and adds important phrases from the articles as utterances for the intents. A bot is then created 420 and trained 422 using various models associated with intent identification and knowledge base ranking. In some embodiments, if a message does not return the right answer from the bot, then the systems and methods relabel the correct intent and knowledge base article for the message. The systems and methods may also retrain the intent classification and knowledge base ranking algorithm to return the correct answer. An automated testing process 424 is used to measure the accuracy of the bot. Blind testing 426 is performed to evaluate the accuracy of the bot without knowing the test set. If the blind testing 426 results are not satisfactory, the knowledge base weights are tuned 428 by changing the knowledge base ranking model weights to improve accuracy and relevancy. In some embodiments, the systems and methods include a machine learning algorithm that optimizes and tunes the weights for various feature scores (e.g., text score, vector score, title similarity, utterance similarity, etc.) to combine those score features. If, after the tuning 428, the results are not satisfactory, method 400 adds utterances and tags to the articles 430 to improve accuracy. In some implementations, if a message response is not the correct article, the systems and methods may add more utterances to improve the likelihood of returning the correct article for the message.

Figure 5:
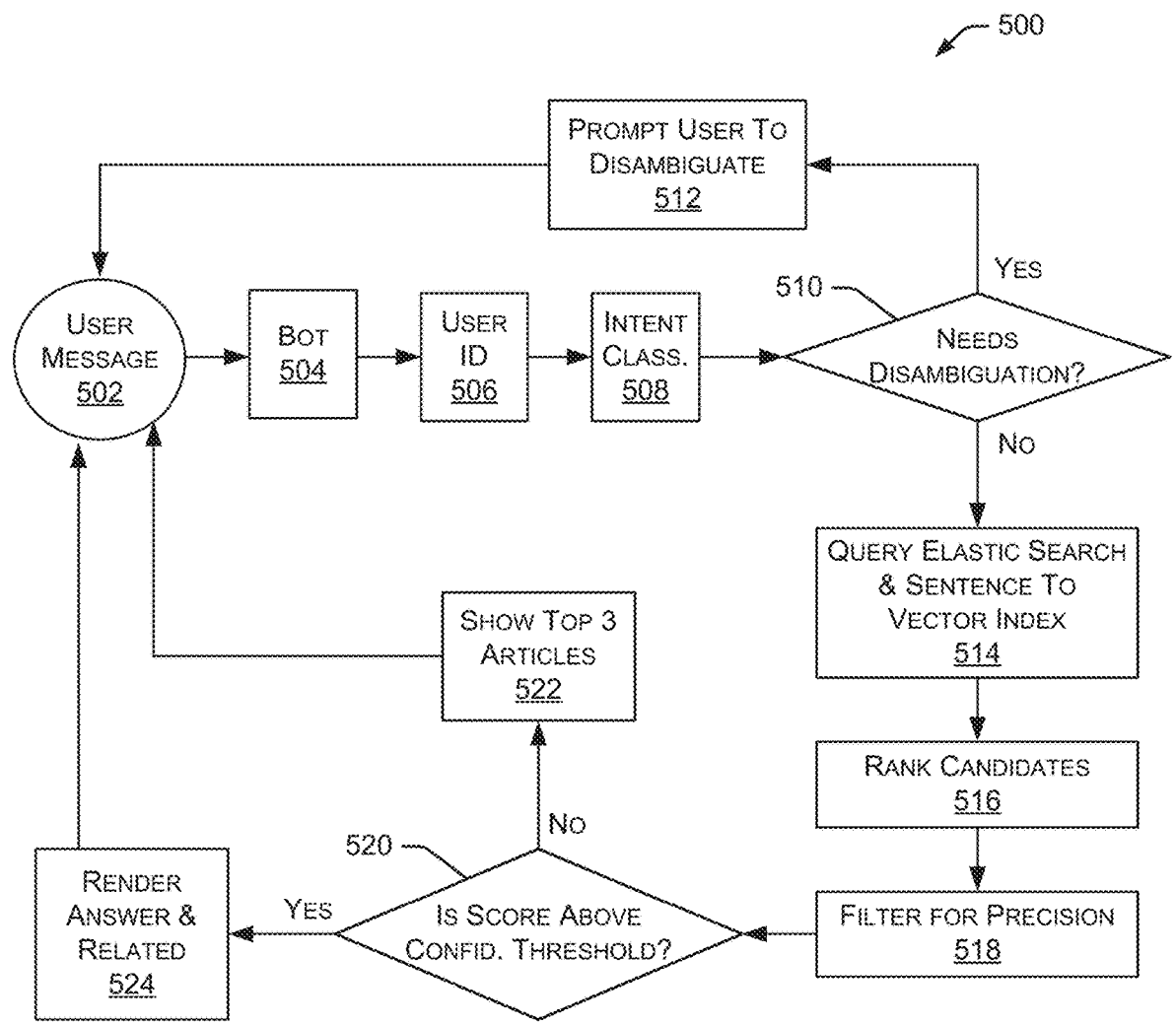
FIG. 5 is a process diagram depicting an embodiment of a method for processing messages received from one or more users.

FIG. 5 is a process diagram depicting an embodiment of a method 500 for processing messages (e.g., questions) received from one or more users. A user message 502 is received from a user or a system associated with a user. In some embodiments, the user message 502 is a verbal message spoken by the user. For example, a driver or occupant of a vehicle may ask a question about operation of the vehicle or other vehicle-related topics. The user message 502 may also be referred to as a "question", "query", and the like. A bot 504 receives the user message 502 and an identity of the user is identified 506. In some embodiments, a cookie-based method is used to give a unique user identifier to each user, and the unique user identifier identifies each user. The method 500 continues as an intent classification model is applied 508 to identify the category for the knowledge base (e.g., the category associated with the user message 502). The method 500 then determines whether disambiguation is necessary 510. For example, if a category is not identified, then the user is prompted to disambiguate 512. In some embodiments, in the case of ambiguity, disambiguation options are presented 512 to the user to select a particular category.

If disambiguation is not necessary at 510, the method 500 continues by attempting to find an appropriate articles associated with the user message 502. For example, the method 500 may include querying 514 an elastic search and sentence to a vector index. The elastic search and text similarity search includes traditional information retrieval methods to search for the presence of words (or synonyms) in a particular query. The vector space similarity search converts a query to a vector using sentence embedding during run time and compares the query vector to the document vectors in the index (computed offline) to find the most relevant document to the query. The method 500 ranks 516 the identified (and relevant) articles and applies filters 518 to determine the best articles.

The method 500 continues by determining 520 whether a relevance score for each article is above a confidence threshold level. In some embodiments, the confidence threshold level is determined by a precision/recall accuracy measure. For example, for a set of messages (for various thresholds), the number of correct responses from the bot are measured. Based on the number of correct responses, the right confidence threshold is determined. If no article is determined to be above the confidence threshold level, then the top three articles 522 are presented or communicated to the user. If at least one article is determined to be above the confidence threshold level, then the top article (e.g., the highest ranked article) is returned 524 to the user.

In some embodiments, the described systems and methods provide a transformed query that removes stop words and intent keywords from the user message. In particular implementations, the systems and methods described herein use various approaches to match the indexed data with the query. When scoring, the systems and methods may specify a scoring function for each document-query combination. In some situations, this scoring may be performed in vector space. After scoring the documents, the systems and methods may rank the results of the scoring.

In some embodiments, the answer a user is expecting is only a portion of a particular article or document. In these situations, the described systems and methods may highlight just the portion that is of interest to the user, rather than providing an entire section of data that contains additional details not necessary to answer the user's question. This approach provides a fast answer to the user and an improved user experience. In some implementations, the systems and methods use the functionality of an elastic search to highlight the specific words in the query that appear in the article and show (or communicate) only those portions.

In some embodiments, the systems and methods use fields such as the title and description of the article to retrieve the fields. In some implementations, metadata is used to help the systems and methods determine which article to retrieve for a particular type of user query, thereby improving accuracy of retrieving the correct document. In particular embodiments, during the indexing phase, the data is indexed using a nested query. During the scoring phase, each tag is treated uniquely. With vector scoring, the systems and methods select the best matched tag for comparing two articles.

In some embodiments, the existence of some of the entities might make an article much more relevant to the query than other articles. For example, the presence of a "gift cards" entity in an article might be more important for queries concerning gift cards or gifts in general. The systems and methods handle this situation by using a query template that allows the process to specify the weight of the extracted entities. For example, during the index time (whenever an article is updated or a new article is created), the systems and methods automatically extract the entities present in the article (e.g., title, description etc.) and store it back in the index. During the configuration, the systems and methods specify the weight of this field. During the messaging, both the elastic search scoring and the vector scoring weighs the field appropriately when calculating the total score. In some embodiments, the systems and methods use noun chunks that are automatically extracted from the article or standard system entities (such as cities, colors, location entities, and the like) to score them.

In some situations, the knowledge base contains large articles. It is typically undesirable to display the entire article in text and undesirable to read the entire article in voice. In some embodiments, the systems and methods summarize the large article and present just the summary to the user (in text or audio format). For example, during the index time, if the systems and methods find the article to be too large, they automatically create a summary of the paragraph using an extractive summarizer. The summarizer picks the salient sentences from the large number of sentences and creates a summary. The summary is then stored back to the index. During the query time, if the systems and methods find the description to be too large, and if summarization is enabled in the bot, the systems and methods return just the summary from the index. In some embodiments, the summary is used as an index to be retrieved if the systems and methods determine that the original article is noisy. In some embodiments, if the article is too big and contains a significant amount of information (other than the relevant parts) that is not relevant to the given query, then a summary might be better to return to the user instead of the entire article.

Figure 6:
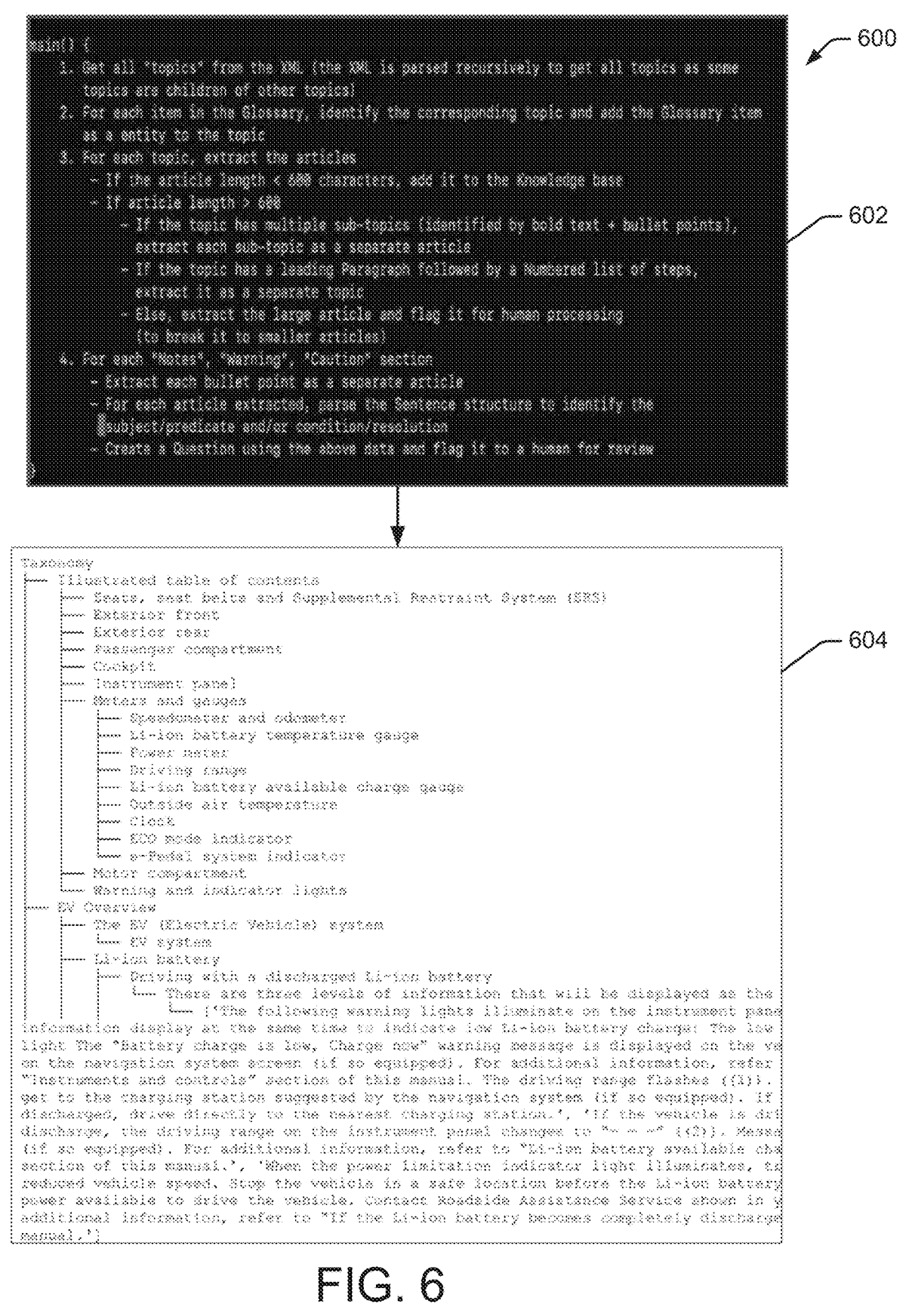

FIG. 6 illustrates an example article extraction 600 from XML using PDF as a reference. As shown in FIG. 6, a source file 602 is analyzed and mapped to a taxonomy file 604.

Automated Utterance Generation

As mentioned above, conversational AI assistants and conversational bots are growing in popularity and their ability to answer questions is an important feature. Using relevant utterances as features in answering questions has shown to improve both the precision and recall for retrieving the right answer by a conversational bot. Therefore, utterance generation has become an important problem with the goal of generating relevant utterances (e.g., sentences or phrases) from a knowledge base article that consists of a title and a description. However, generating good utterances typically requires a significant amount of manual effort, creating the need for an automated utterance generation. The systems and methods discussed herein 1) use extractive summarization to extract important sentences from the description, 2) use multiple paraphrasing techniques to generate a diverse set of paraphrases of the title and summary sentences, and 3) select good candidate paraphrases with the help of a candidate selection algorithm.

Utterance generation is an important problem in Question-Answering, Information Retrieval, and Conversational AI Assistants. Conversational skills developed for these devices need to understand various ways that an end user is asking a question, and be able to respond accurately. While voice assistants are becoming common, chatbots and conversational interfaces are being adopted for various conversational automation use cases such as website assistants, customer service automation and IT and enterprise service automation.

Question-answering is an important part of any conversational automation use case. It is important that a conversational assistant understands various paraphrases and utterances that could be used in asking the same question. Using relevant utterances as features in a question-answering system has shown to improve the accuracy both in terms of precision and recall to retrieve the right answer.

The systems and methods discussed herein address the problem of utterance generation in the context of a conversational virtual assistant and question-answering. As used herein, paraphrases are sentences/phrases that contain different words or different sequences of words but have the same meaning.

A knowledge base article (such as FAQs and manuals) usually consists of a title and an associated description. A user who needs help with a particular issue can frame the same issue in different ways. For example, a user who wants to pay their bill can use "How do I pay my bill?", "I want to pay my bill", or "I wish to settle my dues". But, the article may be titled as "Pay your bill". Existing information retrieval based models lack recall when the words chosen by a user are different from the article but are semantically related. Enriching articles with utterances which are semantically similar to their content can improve recall and precision of IR using the systems and methods described herein. As described below, the systems and methods automatically generate utterances for a given article, which can be further curated and used by human annotators to prepare a final list of reference utterances for the article.

In some embodiments, a conversational assistant user can refer to an article using an utterance which is either a paraphrase of the title or is related to the text present in the description. The former motivates the need for paraphrase generation. However, descriptions can be long and often contain sentences that users don't refer to. Therefore, the systems and methods use extractive summarization to select important sentences from the description, following which the systems and methods generate paraphrases for each of the extracted sentences as well as the title of an article. The goal is to generate a diverse set of paraphrases for a sentence and, therefore, the systems and methods attempt to generate a large number of diverse paraphrases. The systems and methods first use multiple paraphrasing techniques to generate a large pool of paraphrases followed by implementation of a candidate selection algorithm to select useful and relevant paraphrases for each input sentence.

Figure 7:
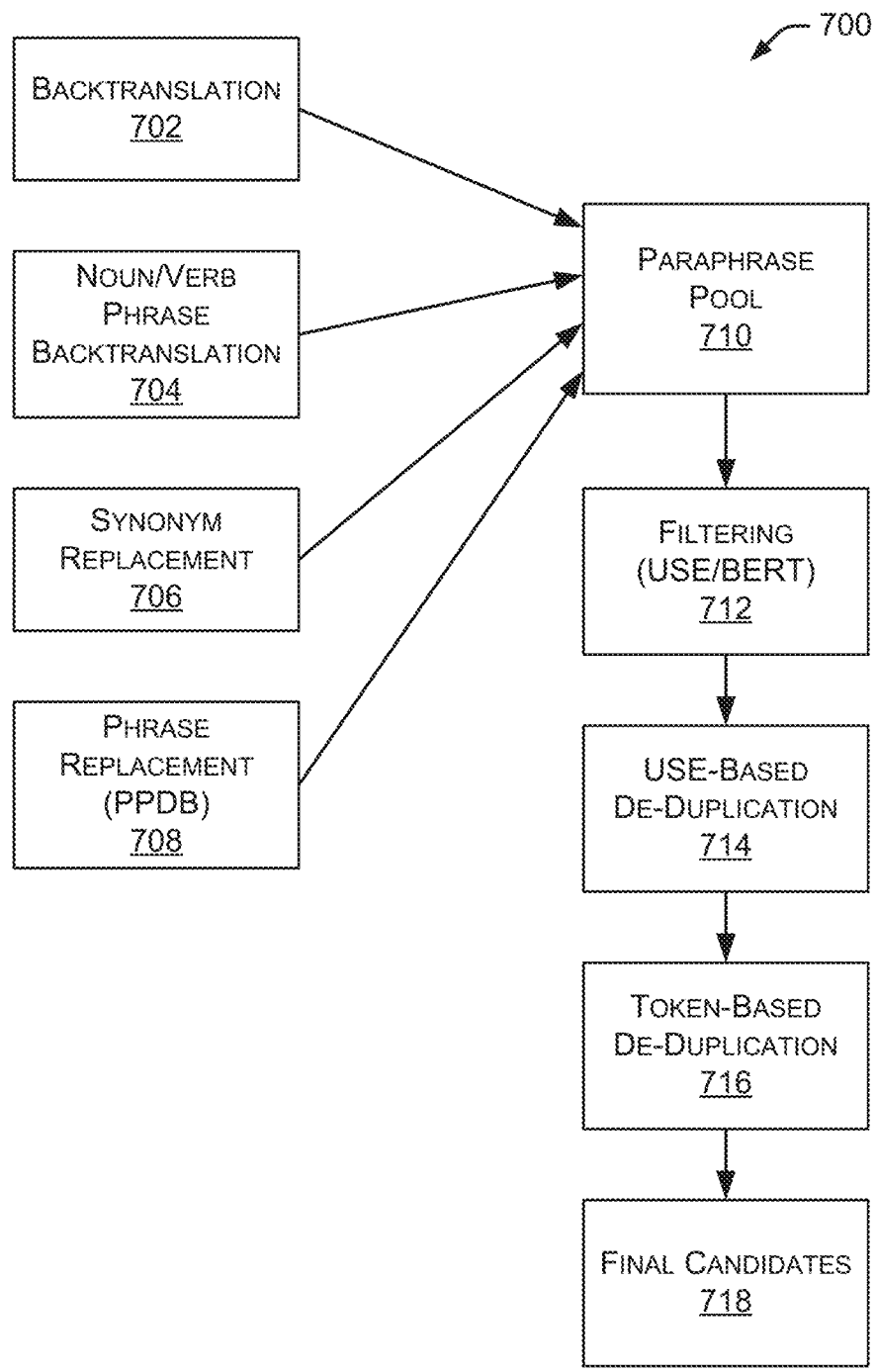
FIG. 7 is a process diagram depicting an embodiment of a method for generating paraphrases and selecting candidates.

FIG. 7 is a process diagram depicting an embodiment of a method 700 for generating paraphrases and selecting candidates. Paraphrase generation uses many different methods for generating paraphrases, such as full backtranslation 702, noun/verb phrase backtranslation 704 using constituency parsing, synonym replacement 706, and phrase replacement 708.

The systems and methods perform full backtranslation 702 using neural machine translation models for generating paraphrases. In some embodiments, the systems and methods first generate multiple German translations of the input English sentence. For each of the German translations, the systems and methods generate multiple English translations. In order to generate multiple translations, the systems and methods use beam search at the time of decoding. In other embodiments, any other language may be used instead of German.

The described systems and methods use noun/verb phrase backtranslation 704 by generating paraphrases for a certain meaningful phrase from the input sentence. In some embodiments, the systems and methods use the Berkeley Neural Parser (Kitaev and Klein 2018) to perform constituency parsing and extract all noun and verb phrases from the input sentence. For each of these extracted phrases, the systems and methods generate backtranslations and replace the phrase in the original sentence with its respective backtranslations.

In some situations for implementing synonym replacement 706, paraphrasing involves replacing a single word with another having equivalent meaning in the context. To account for this, the systems and methods find synonyms for words in the input sentence from synsets obtained using WordNet (Miller 1995) and replace the word with its synonym. In some implementations, the systems and methods do not consider words which are stopwords, whose part-of-speech tag belongs to a manually curated list of tags, or which are less than three characters long.

WordNet typically contains synonyms for single words, whereas noun and verb phrase backtranslation generate paraphrases for only certain types of phrases. Phrase replacement 708 (PPDB) is a database of paraphrases of commonly occurring phrases, extracted from a bilingual corpus. The described systems and methods use this resource to replace all matching phrases from the input sentence with their paraphrases.

The multiple techniques for paraphrasing discussed above generates a large pool 710 of paraphrases that could potentially contain sentences which are semantically different from the input sentence or synonyms replaced in the wrong context as well as duplicates of the title and each other. This necessitates a method to select relevant candidate paraphrases. As part of the candidate selection algorithm, the systems and methods first remove the irrelevant sentences using a filtering mechanism 712, following which the systems and methods use a de-duplication method 714 (USE-Based de-duplication) and 716 (Token-Based de-duplication) to remove duplicates. The goal of filtering is to remove paraphrases that are not semantically equivalent. As shown in FIG. 7, the filtering and de-duplication 712-716 is associated with candidate selection. The result of the processing in FIG. 7 is one or more final candidates 718.

In some embodiments, USE-based de-duplication 714 uses the Universal Sentence Encoder to get vector representations of the input sentence and the paraphrase, and compute the cosine similarity between them. If the cosine similarity between the representations is less than 0.5, the paraphrase is considered to be semantically different and is discarded. Analogously, if the similarity is greater than 0.95, the paraphrase is considered to be a duplicate of the input and, therefore, is also discarded.

In some embodiments, USE-based similarity does not explicitly tell if the paraphrase is semantically equivalent to the input sentence, but instead determines how similar the paraphrase is to the sentence. For similar sentences (e.g., sentences with high word overlap) which are not semantically equivalent, USE-based filtering may not work. To improve the precision of filtering, the systems and methods use a paraphrase detection model based on BERT (Devlin et al. 2019).

FIG. 8 illustrates multiple example paraphrases 800 generated by the systems and methods discussed herein.

In some embodiments, to remove duplicates, the systems and methods run two algorithms sequentially after the filtering step. FIG. 9 illustrates a first algorithm 900 that uses similarity based on USE to de-duplicate the pool 710. In particular, algorithm 900, at every step, finds the paraphrase that has the highest cosine similarity with the original sentence and selects it if it does not have a high similarity with any of the paraphrases already selected.

FIG. 10 illustrates a second algorithm 1000 that diversifies the final set by selecting the paraphrase with the highest number of unique words at every step. The systems and methods only consider words that are not stopwords, have a character length of more than two and whose POS tags do not belong to a manually curated list of POS tags (such as prepositions, conjunction words, and forms of the verbs "be" and "have").

When performing deduplication, many of the paraphrases generated may have just one or two keywords which are different and unique from the input sentence. It is important to select the sentences that are more related to the input sentence and which also are more probable as a sentence. Therefore, for each paraphrase, the systems and methods compute two scores, namely, the similarity between the USE encodings of the input sentence and the paraphrase, and a score computed using the cross entropy loss from the BERT model probabilities. The systems and methods normalize both of these scores across examples and use the average for tie-breaking.

In some embodiments, the systems and methods select the important sentences from the description by using extractive summarization. In particular implementations, the systems and methods only summarize a description if it is more than three sentences long. Otherwise, all sentences are selected as important sentences.

As discussed above, given an article in a knowledge base consisting of a title and a description, the goal of the utterance generation process is to generate different utterances that potentially correspond to users' utterances with that particular knowledge base article. These generated utterances can be further curated and used by human annotators to prepare a final list of utterances for the article. As discussed herein, the method proposed for utterance generation uses paraphrase generation and extractive summarization techniques to generate utterances. Paraphrase generation is used to generate multiple paraphrases of the title of an article, whereas extractive summarization is used to select the relevant sentences from the description of the article.

For paraphrase generation, to encourage diversity, the systems and methods use multiple techniques to over-generate paraphrases for a given input sentence. For example, the systems and methods may generate five best German translations of the input sentence (using beam search). For each of these translations, the systems and methods generate five best English translations, also using beam search, resulting in a total of 25 paraphrases for an input sentence. The systems and methods extract all noun and verb phrases from the input sentence using constituency parsing. Once noun and verb phrases are obtained, the systems and methods obtain 25 backtranslations for each of these phrases (using the same method as in the previous method) and replace the original phrase in the input sentence with the backtranslated phrase.

In some situations, a user might input different verbs/nouns for the same meaning, which the backtranslation might not capture. To account for this, the systems and methods replace nouns, verbs and adjectives (excluding variations of "be" and "have") with their respective synonyms from synsets obtained using WordNet. The previous method for synonym replacement replaces only a single word. Because of this, the systems and methods use look-up into the PPDB database to replace longer phrases, typically of two to four words, with their paraphrases. The pool of generated paraphrases from the first step is very likely to contain irrelevant paraphrases as well as duplicates. Therefore, the systems and methods apply a filtering and de-duplication method to the paraphrase pool and restrict the final size of the paraphrase set.

The filtering step uses Universal Sentence Encoder embeddings to compute similarity between the original sentence and the generated sentence, and it removes very similar or very dissimilar paraphrases from the pool. The systems and methods run two algorithms sequentially for de-duplicating the pool of paraphrases obtained after filtering. The first algorithm uses similarity based on USE to de-duplicate the pool. For example, at every step, the algorithm finds the paraphrase that has the highest similarity with the original sentence and selects it if it does not have a high similarity with any of the paraphrases already selected. The second algorithm focuses on selecting a diverse set of paraphrases by selecting the paraphrase with the highest number of unique unigrams at every step. A word is allowed if it is not a stopword, has a character length of more than two and its POS tag does not belong to a manually curated list of POS tags (e.g., prepositions, conjunction words, forms of the verbs "be", "have", etc.)

For generating utterances from the description, the systems and methods use extractive summarization to select salient and important sentences from the description. For each of the sentence in the summary, the systems and methods generate paraphrases using the paraphrase generation method described above. The systems and methods also perform question generation (using syntactic rules based on dependency parsing) from the summary sentences. For example, from the sentence "If you want to disconnect your phone and use it again later, simply touch Disconnect on the Bluetooth settings screen", the systems and methods generate relevant questions such as "How can I disconnect my phone?", "How do I disconnect my phone?", and "What is the procedure to disconnect my phone?".

In many situations, bots are multilingual. Therefore, the described systems and methods support the transfer of features into different languages. To support different languages, the systems and methods use plugins for elastic search, and for vector search, the systems and methods use word segmenters in combination with a sentence encoder that is trained in different languages.

In some embodiments, knowledge bases may have a large number of articles belonging to potentially multiple non-overlapping categories. For example: Gift Cards, Returns, Rewards, Credit Cards, etc. are different categories for an ecommerce FAQ knowledge base. When a user queries a knowledge base about a question on gift cards, the systems and methods provide a better user experience (better related articles) and a higher accuracy if they search only on the articles in the gift card category.

When creating a knowledge base, the systems and methods also categorize the articles into various categories they belong to. For each of the categories, the systems and methods automatically create an intent with all the tags of all the articles in the category added to the intent. The systems and methods then train an intent classification engine. At prediction time, the intent classification engine identifies the category of the knowledge base to which the query belongs. The systems and methods will then only search the knowledge base with the specified category, hence having a better experience.

Although the described systems and methods use elastic search to search for documents that have words similar to the words in the query, it is desirable for users to be able to query the knowledge base in their words. Even if the user doesn't use the words mentioned in the articles, the systems and methods should retrieve the right article. In some embodiments, the systems and methods can map words/sentences to a higher dimensional space and search in this higher dimension space.

Given a document, the systems and methods create sentence embeddings for title, each sentence of description, and each of the tags/utterances using a sentence embedding technique. These embeddings are indexed separately (one for each field) using a nearest neighbor technique. The systems and methods load these in memory at run time. Given a query, the systems and methods convert the query to a vector using a sentence embedding technique. The systems and methods then search for the query vector in each of the field vectors. This is a search in the vector space and uses approximate nearest neighbor to optimize for performance. Given the scores and top vectors in each of the fields, the systems and methods learn the weights of these fields using a linear model optimized on user data.

In a knowledge base system, some conversations or dialogs are one-shot (e.g., the user asks a question and the bot responds with an article or document). In other situations, the bot may not have all the information to answer the question. The systems and methods described herein allow the bot to navigates the system (based on entities) to find the right answer by asking the right question. This is accomplished by getting the right articles for the query based on Elastic Search+Vector Search+Re-ranker. The systems then get the entities/metadata from the query and also get them for each article. If they all match, then the method continues. However, if they don't match, the systems and methods find the difference in the entities and get the priority from the missing entities and generate a question for the entity. The systems and methods then prompt the user with this question. The process is repeated until a valid article is identified.

In some embodiments, a reranker provides a second pass ranker on top of the initial results given by elastic search and vector search. The reranker is useful for the following reasons: elastic search and vector search are recall based (the systems and methods are optimized to retrieve the article if it exists in the top k results). However, in conversational scenarios, the systems and methods would need to be more precise on the top-1 or top-3 articles. This needs for a precision-based approach that is trained to retrieve the correct top-1 answer and penalizes wrong answers at top positions.

In some embodiments, the user can ask different types of questions. Sometimes there are multiple correct answers to the question and the systems and methods should be able to detect that situation and give the user a better experience and show multiple answers. In some situations, elastic search and vector search are not normalized and cannot be compared across different scoring mechanisms to know how similar or dissimilar the top articles are. The user can ask questions which have no answer in the knowledge base but do have some similar answers. Knowing when the systems and methods don't have an answer is crucial to give a better experience. Elastic search and vector search are recall based approaches and typically don't give a good uniform score that can be used to determine this.

In some embodiments, the systems and methods gather different sources of data from the knowledge base (the tags added for each article, the user messages that are labeled by analysts to mark the correct answers, and also click data of the users to map their queries to the correct article). All these give the data in the format (User Query Article ID). The systems and methods use each of these examples as a positive example and query the knowledge base to get the closest articles to the query as negative examples.

The systems and methods train a classifier that takes in all the article data (including the vector search and elastic search scores) and query as input for each of these examples and classify whether the article is correct or not. The output of this classifier is a number between 0 and 1. The closer to 1, the more confident the systems and methods are in saying it is the correct article.

If the re-ranker is enabled for the bot, the systems and methods get the results from vector search and elastic search, predict the score using the classifier and re-rank the results based on this score. If the first result's score is less than a minimum threshold, the systems and methods don't return any results. If it is less than a not confident threshold (>minimum threshold), the systems and methods tell the user that the system is not sure and show the user a few related articles that are above the minimum threshold. If the scores of the top few results are close and are greater than the not confident threshold, the systems and methods tell the users that it found several similar articles and return these similar articles that are all relevant.

In some embodiments, the user can provide a decision tree (if the user picks Apple, respond with this. If the user picks Orange, respond with that). This approach enables customers (e.g., system administrators) to easily configure flows and build chatbots very quickly. In the naive version of the system, the user has to exactly match what was configured by the customer. However, the end users should be able to say something similar and still be able to navigate the decision tree. To solve this problem, the described systems and methods integrate dialog acts into the knowledge base decision trees. Dialog Acts are types of speech acts that serve common actions with respect to navigating a decision tree. The following are examples of dialog acts:

Affirm—user has agreed to what the bot asked (typically a Yes/No question)

Negate—user has disagreed to what the bot asked (typically a Yes/No question)

Show more—user wants to see more of what was asked.

Go Back—User wants to go back one step

Skip—user wants to skip this step

Hold—user wants to hold

Repeat—user didn't hear what was said by the bot.

Restart—user wants to restart the flow

Abort—user wants to abort the flow

In some embodiments, the described systems and methods include a classifier to classify the user utterances to dialog acts. In one implementation, this is accomplished using bidirectional attention and context aware self attention.

Figure 11:
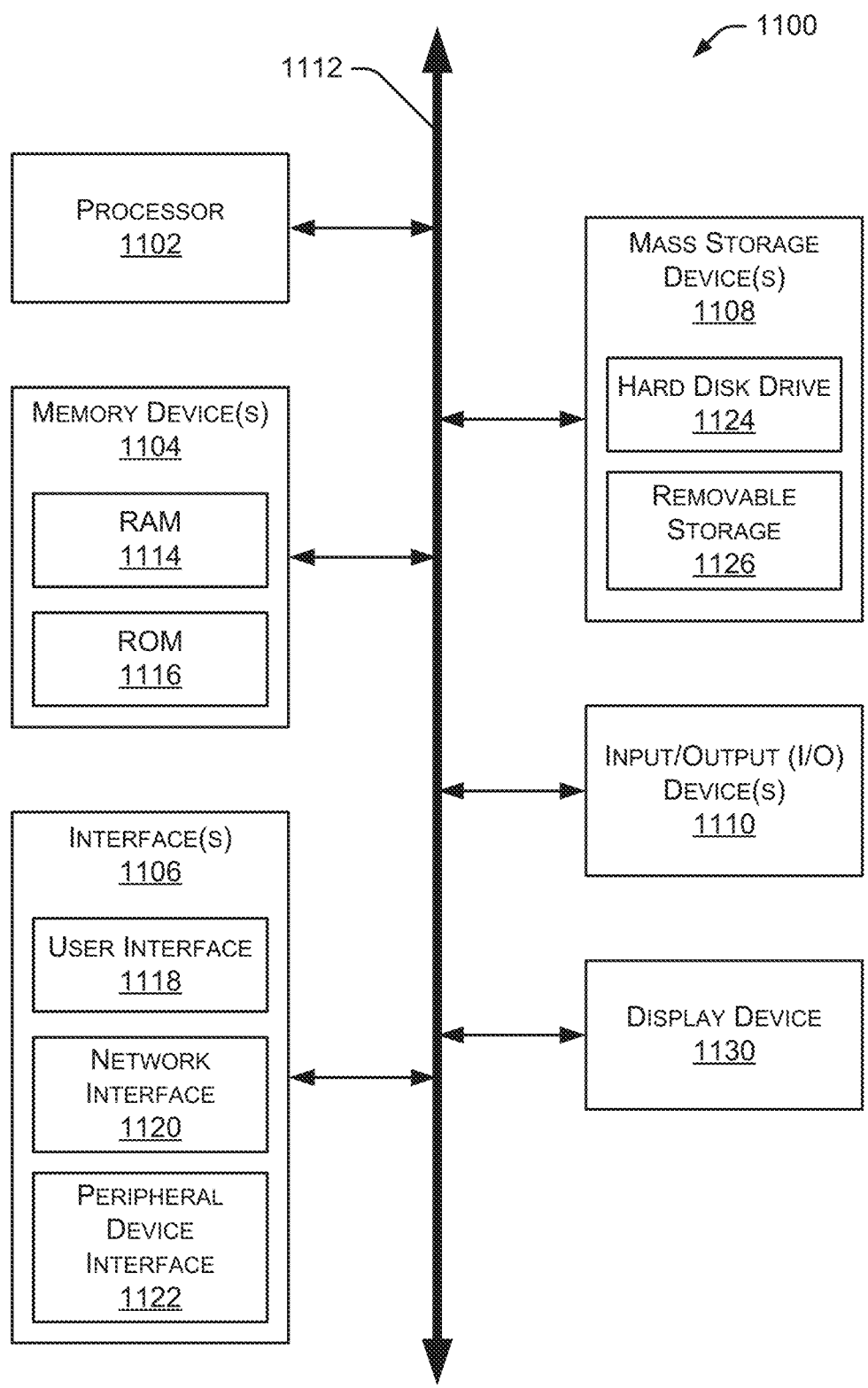
FIG. 11 is a block diagram illustrating an example computing device suitable for implementing the systems and methods described herein.

FIG. 11 is a block diagram illustrating an example computing device 1100 suitable for implementing the systems and methods described herein. In some embodiments, a cluster of computing devices interconnected by a network may be used to implement any one or more components of the systems discussed herein.

Computing device 1100 may be used to perform various procedures, such as those discussed herein. Computing device 1100 can function as a server, a client, or any other computing entity. Computing device can perform various functions as discussed herein, and can execute one or more application programs, such as the application programs described herein. Computing device 1100 can be any of a wide variety of computing devices, such as a desktop computer, a notebook computer, a server computer, a handheld computer, tablet computer and the like.

Computing device 1100 includes one or more processor(s) 1102, one or more memory device(s) 1104, one or more interface(s) 1106, one or more mass storage device(s) 1108, one or more Input/Output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method of generating an utterance, the method comprising:

paraphrasing, by a computing system, a portion of a document using at least two different paraphrasing techniques to generate a plurality of candidate paraphrases;

selecting, by the computing system, relevant paraphrases from the plurality of candidate paraphrases by:

filtering the plurality of candidate paraphrases, and performing de-duplication of the plurality of candidate paraphrases using vector representations of the sentence and the plurality of candidate paraphrases determined via a neural sentence encoder of the computing system, wherein one or more candidate paraphrases are discarded based on computed cosine similarities between the vector representations; and selecting, by the computing system, the utterance from the relevant paraphrases.

2. The method of claim 1, further comprising applying extractive summarization to select the portion of the document from best text portions of the document.

3. The method of claim 1, wherein the at least two different paraphrasing techniques include full backtranslation using a neural machine translation model.

4. The method of claim 1, wherein the at least two different paraphrasing techniques include noun/verb phrase backtranslation.

5. The method of claim 1, wherein the at least two different paraphrasing techniques include synonym replacement.

6. The method of claim 1, wherein the at least two different paraphrasing techniques include phrase replacement.

7. The method of claim 1, wherein de-duplication comprises: determining, via the neural sentence encoder of the computing system, a first vector representation of a portion of the document and a respective vector representation of each of the plurality of candidate paraphrases; and discarding the one or more candidate paraphrases based on a computed respective cosine similarity between the first vector representation and the respective vector representation of each of the plurality of candidate paraphrases.

8. The method of claim 7, wherein discarding the one or more candidate paraphrases comprises:
discarding a particular candidate paraphrase if the respective cosine similarity is less than 0.5.

9. The method of claim 7, wherein discarding the one or more candidate paraphrases comprises:
discarding a particular candidate paraphrase if the respective cosine similarity is greater than 0.95.

10. The method of claim 1, comprising:
performing token-based de-duplication of the plurality of candidate paraphrases.

11. The method of claim 1, wherein filtering the plurality of candidate paraphrases includes removing irrelevant sentences.

12. A method of generating an utterance, the method comprising:
paraphrasing, by a computing system, a sentence of a document using at least two different paraphrasing techniques to generate a plurality of candidate paraphrases;
selecting, by the computing system, relevant paraphrases from the plurality of candidate paraphrases by:
filtering the plurality of candidate paraphrases; and
performing de-duplication of the plurality of candidate paraphrases by:
determining, via a neural sentence encoder of the computing system, a first vector representation of the sentence and a respective vector representation for each of the plurality of candidate paraphrases,
computing a respective cosine similarity between the first vector representation and the respective vector representation of each of the plurality of candidate paraphrases, and
discarding one or more of the plurality of candidate paraphrases based on the cosine similarities; and
selecting, by the computing system, the utterance from the relevant paraphrases.

13. The method of claim 12, wherein the at least two different paraphrasing techniques include at least two of full backtranslation, noun/verb phrase backtranslation, synonym replacement, and phrase replacement.

14. The method of claim 12, further comprising discarding a particular paraphrase if the respective cosine similarity is less than 0.5 or greater than 0.95.

15. The method of claim 12, wherein filtering the plurality of candidate paraphrases includes removing irrelevant sentences.

16. The method of claim 12, comprising:
applying extractive summarization to select the sentence from best text portions of the document.

17. A method of generating utterances, the method comprising:
paraphrasing, by a computing system, a portion of a document using at least two different paraphrasing techniques to generate a plurality of candidate paraphrases;
de-duplicating, by the computing system, the plurality of candidate paraphrases using vector representations determined by a neural sentence encoder of the computing system for the portion of the document and for each of the plurality of candidate paraphrases, wherein one or more candidate paraphrases are discarded based on computed cosine similarities between the vector representations; and
selecting, by the computing system, the utterances from the plurality of candidate paraphrases.

18. The method of claim 17, comprising:
removing a particular candidate paraphrase from the plurality of candidate paraphrases when a respective computed cosine similarity between a vector representation of the portion of the document and a vector representation of the particular candidate paraphrase is less than 0.5 or greater than 0.95.

19. The method of claim 17, wherein, prior to de-duplicating, the method comprises:
filtering, by the computing system, the plurality of candidate paraphrases to remove irrelevant paraphrases.

20. The method of claim 17, wherein the at least two paraphrasing techniques include full backtranslation via a neural machine translation model, noun/verb phrase backtranslation via a neural parser, or a combination thereof.

\* \* \* \* \*